United States Patent
Aingaran et al.

(10) Patent No.: US 7,310,709 B1
(45) Date of Patent: Dec. 18, 2007

(54) METHOD AND APPARATUS FOR PRIMARY CACHE TAG ERROR HANDLING

(75) Inventors: Kathirgamar Aingaran, Sunnyvale, CA (US); Ramaswamy Sivaramakrishnan, San Jose, CA (US); Sanjay Patel, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 254 days.

(21) Appl. No.: 11/100,997

(22) Filed: Apr. 6, 2005

(51) Int. Cl.
*G06F 11/00* (2006.01)
*G06F 12/00* (2006.01)
*G06F 12/08* (2006.01)

(52) U.S. Cl. .............. 711/144; 711/145; 711/122; 711/123; 714/5; 714/6

(58) Field of Classification Search .............. None
See application file for complete search history.

(56) References Cited

U.S. PATENT DOCUMENTS

| | | | |
|---|---|---|---|
| 5,987,579 A * | 11/1999 | Nishtala et al. | 711/169 |
| 2002/0087807 A1 * | 7/2002 | Gharachorloo et al. | 711/141 |
| 2003/0208658 A1 * | 11/2003 | Magoshi | 711/122 |
| 2005/0120184 A1 * | 6/2005 | Quach et al. | 711/144 |
| 2006/0010354 A1 * | 1/2006 | Azevedo et al. | 714/48 |

\* cited by examiner

*Primary Examiner*—Donald Sparks
*Assistant Examiner*—Chad L Davidson
(74) *Attorney, Agent, or Firm*—Martine Penilla & Gencarella, LLP

(57) ABSTRACT

A method and apparatus is disclosed for maintaining coherency between a primary cache and a secondary cache in a directory-based cache system. Upon identifying a parity error in the primary cache, a tag parity packet and a load instruction are sent from the primary cache to the secondary cache. In response to the tag parity packet, each tag entry in the secondary cache that is associated with the parity error is invalidated. Upon receiving an acknowledgment of receipt of the tag parity packet, the primary cache functions to invalidate each tag entry in the primary cache that is associated with the parity error. Then, the secondary cache communicates data requested in the load instruction to the primary cache.

20 Claims, 8 Drawing Sheets

| Index | Way 0 | Way 1 | Way 2 | Way 3 |
|---|---|---|---|---|
| 0 | tag entry (w=0,i=0) | tag entry (w=1,i=0) | tag entry (w=2,i=0) | tag entry (w=3,i=0) |
| 1 | tag entry (w=0,i=1) | tag entry (w=1,i=1) | tag entry (w=2,i=1) | tag entry (w=3,i=1) |
| 2 | tag entry (w=0,i=2) | tag entry (w=1,i=2) | tag entry (w=2,i=2) | tag entry (w=3,i=2) |
| 3 | tag entry (w=0,i=3) | tag entry (w=1,i=3) | tag entry (w=2,i=3) | tag entry (w=3,i=3) |
| ... | ... | ... | ... | ... |
| 124 | tag entry (w=0,i=124) | tag entry (w=1,i=124) | tag entry (w=2,i=124) | tag entry (w=3,i=124) |
| 125 | tag entry (w=0,i=125) | tag entry (w=1,i=125) | tag entry (w=2,i=125) | tag entry (w=3,i=125) |
| 126 | tag entry (w=0,i=126) | tag entry (w=1,i=126) | tag entry (w=2,i=126) | tag entry (w=3,i=126) |
| 127 | tag entry (w=0,i=127) | tag entry (w=1,i=127) | tag entry (w=2,i=127) | tag entry (w=3,i=127) |

Fig. 2

| Index | Way 0 | Way 1 | Way 2 | Way 3 |
|---|---|---|---|---|
| 0 | data entry (w=0,i=0) | data entry (w=1,i=0) | data entry (w=2,i=0) | data entry (w=3,i=0) |
| 1 | data entry (w=0,i=1) | data entry (w=1,i=1) | data entry (w=2,i=1) | data entry (w=3,i=1) |
| 2 | data entry (w=0,i=2) | data entry (w=1,i=2) | data entry (w=2,i=2) | data entry (w=3,i=2) |
| 3 | data entry (w=0,i=3) | data entry (w=1,i=3) | data entry (w=2,i=3) | data entry (w=3,i=3) |
| ... | ... | ... | ... | ... |
| 124 | data entry (w=0,i=124) | data entry (w=1,i=124) | data entry (w=2,i=124) | data entry (w=3,i=124) |
| 125 | data entry (w=0,i=125) | data entry (w=1,i=125) | data entry (w=2,i=125) | data entry (w=3,i=125) |
| 126 | data entry (w=0,i=126) | data entry (w=1,i=126) | data entry (w=2,i=126) | data entry (w=3,i=126) |
| 127 | data entry (w=0,i=127) | data entry (w=1,i=127) | data entry (w=2,i=127) | data entry (w=3,i=127) |

| Core 0 | | | | Core 1 | | | | ... | Core 7 | | | | Index |
|---|---|---|---|---|---|---|---|---|---|---|---|---|---|
| Way 0 | Way 1 | Way 2 | Way 3 | Way 0 | Way 1 | Way 2 | Way 3 | | Way 0 | Way 1 | Way 2 | Way 3 | |
| | | | | | | | | . . . | | | | | 64 |
| | | | | | | | | . . . | | | | | 65 |
| | | | | | | | | . . . | | | | | 66 |
| | | | | | | | | . . . | | | | | 67 |
| . . . | . . . | . . . | . . . | . . . | . . . | . . . | . . . | . . . | . . . | . . . | . . . | . . . | . . . |
| | | | | | | | | . . . | | | | | 92 |
| | | | | | | | | . . . | | | | | 93 |
| | | | | | | | | . . . | | | | | 94 |
| | | | | | | | | . . . | | | | | 95 |

METHOD AND APPARATUS FOR PRIMARY CACHE TAG ERROR HANDLING

BACKGROUND

It is common for a modern microprocessor chip ("chip") to implement a cache system including a first cache level and a second cache level. The first cache level represents a small amount of very fast memory defined on the chip. The first cache level is used to provide a temporary holding place for data and instructions that have recently been transferred to or from a main memory that resides outside the chip. The second cache level is generally larger than the first cache level. The second cache level is defined between the first cache level and the main memory. Data access operations between the first cache level and the second cache level can be performed faster than between the first cache level and the main memory. Thus, the second cache level represents an intermediate memory that can quickly service requests from the first cache level.

In a multiprocessor chip, a single second cache level is often used to service multiple first cache levels corresponding to multiple processors. In general, the second cache level maintains a copy of the data in the first cache level of each processor. Thus, multiple first cache levels may store a common data item that is also stored in the second cache level. During operation of the cache system, it is important to maintain coherency between the first and second cache levels. This is particularly true when handling data errors identified within the first cache level. For example, if the first cache level modifies data stored therein due to identification of an error, the corresponding data in the second cache level needs to be modified in the same manner to remain consistent. Otherwise, a coherency problem may occur later.

Because the first cache level communicates directly with the processor, it is important to operate the first cache level in the most efficient manner possible. Therefore, a continuing need exists for advancements in cache system operation, particularly with respect to optimization of error handling in the first cache level while maintaining coherence with the second cache level.

SUMMARY

It should be appreciated that the present invention can be implemented in numerous ways, such as a process, an apparatus, a system, a device or a method. Several inventive embodiments of the present invention are described below.

In one embodiment, a multiprocessor chip is disclosed. The multiprocessor chip includes a primary cache having primary cache logic and a secondary cache having secondary cache logic. The primary cache is defined to include a tag structure. The secondary cache is defined to include a tag directory representing the tag structure of the primary cache. A first portion of the primary cache logic is defined to identify a parity error in the tag structure of the primary cache. In response to identifying the parity error, a second portion of the primary cache logic is defined to send a tag parity packet from the primary cache to the secondary cache. A first portion of secondary cache logic is defined to invalidate each entry in the tag directory of the secondary cache as identified by the tag parity packet. A second portion of secondary cache logic is defined to send an acknowledgment of receipt of the tag parity packet to the primary cache logic. In response to the acknowledgment, a third portion of primary cache logic is defined to invalidate each entry in the tag structure of the primary cache that is associated with the parity error.

In another embodiment, a method is disclosed for maintaining coherency between a primary cache and a secondary cache in a directory-based cache system. The method includes identifying a parity error in the primary cache. Upon identifying the parity error, a tag parity packet is sent from the primary cache to the secondary cache. Each tag entry in the secondary cache that is associated with the parity error is then invalidated. The method further includes receiving an acknowledgement at the primary cache to indicate receipt of the tag parity packet at the secondary cache. Then, in response to receiving the acknowledgment, each tag entry in the primary cache that is associated with the parity error is invalidated.

In another embodiment, an apparatus for maintaining coherency within a cache system is disclosed. The apparatus includes a primary cache having a tag structure. The apparatus also includes a secondary cache having a tag directory structure. The tag directory structure represents the tag structure of the primary cache. The apparatus further includes primary cache logic and secondary cache logic. The primary cache logic is defined to control the primary cache and communicate with the secondary cache. The secondary cache logic is defined to control the secondary cache and communicate with the primary cache. The primary cache logic is configured to identify a parity error in an entry of the tag structure of the primary cache, and send a tag parity packet to the secondary cache logic upon identifying the parity error. Upon receiving the tag parity packet, the secondary cache logic is configured to invalidate each entry in the tag directory structure that is associated with the parity error. The secondary cache logic is further configured to send an acknowledgement to the primary cache logic indicating receipt of the tag parity packet. Upon receiving the acknowledgment, the primary cache logic is configured to invalidate each entry in the tag structure that is associated with the parity error.

Other aspects of the invention will become apparent from the following detailed description, taken in conjunction with the accompanying drawings, illustrating by way of example the principles of the invention.

BRIEF DESCRIPTION OF THE DRAWINGS

FIG. 2 is an illustration showing an tag structure corresponding to each of the instruction cache tag structure and the data cache tag structure, in accordance with an exemplary embodiment of the present invention;

FIG. 3 is an illustration showing a data structure corresponding to each of the instruction cache data structure and the data cache data structure, in accordance with the exemplary embodiment of FIG. 2;

FIG. 4A is an illustration showing an exemplary layout of the L1 I$ tag directory and the L1 D$ tag directory of L2 Bank 0;

FIG. 4B is an illustration showing an exemplary layout of the L1 I$ tag directory and the L1 D$ tag directory of L2 Bank 1;

FIG. 4C is an illustration showing an exemplary layout of the L1 I$ tag directory and the L1 D$ tag directory of L2 Bank 2;

FIG. 4D is an illustration showing an exemplary layout of the L1 I$ tag directory and the L1 D$ tag directory of L2 Bank 3.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
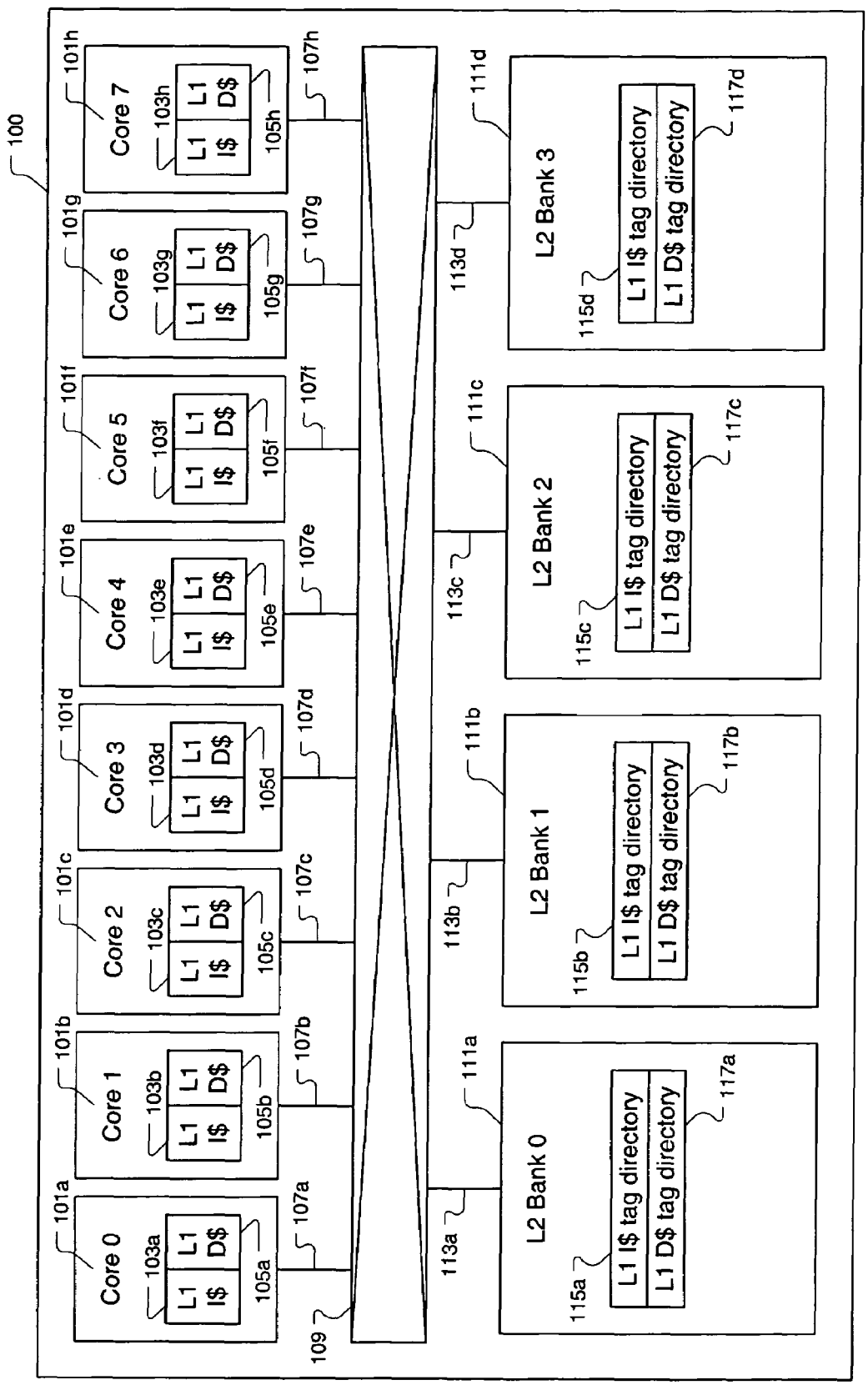
FIG. 1 is an illustration showing a multiprocessor chip, in accordance with one embodiment of the present invention.

FIG. 1 is an illustration showing a multiprocessor chip 100, in accordance with one embodiment of the present invention. In the embodiment of FIG. 1, the multiprocessor chip 100 is shown to include eight processor cores, identified as Core 0 (101a) through Core 7 (101h). It should be appreciated, however, that in other embodiments the multiprocessor chip 100 can have less than or more than eight processor cores. Each of the processor cores 101a-101h are connected to a bus 109 of the multiprocessor chip 100, as indicated by connections 107a-107h. In one embodiment, the bus 109 is implemented as a crossbar bus. Additionally, each of the processor cores 101a-101h is defined to include a primary cache (L1) that includes an instruction cache (103a-103h) and a data cache (105a-105h). With respect to FIG. 1, each instruction cache (103a-103h) of each processor core (101a-101h) is labeled as "L1 I$." Similarly, each data cache (105a-105h) of each processor core (101a-101h) is labeled as "L1 D$." It should be appreciated that the primary cache of each processor core is a separate and independent instantiation of primary cache. In other words, even though the structure of the primary cache in each processor core is identical, each processor core maintains independent control over its own primary cache.

The multiprocessor chip 100 further includes a secondary cache (L2). In the embodiment of FIG. 1, the secondary cache (L2) is shown to be implemented in four banks identified as L2 Bank 0 (111a), L2 Bank 1 (111b), L2 Bank 2 (111c), and L2 Bank 3 (111d). Each bank of the secondary cache (L2) is connected to the bus 109, as indicated by connections 113a-113d. Thus, each processor core 101a-101h, including its respective primary cache (L1), is capable of communicating with any bank of the secondary cache (L2) via the connections 107a-107h, the bus 109, and the connections 113a-113d. It should be understood that communication between the processor cores 101a-101h (including the primary caches) and the secondary cache 111a-111d can be performed in a bi-directional manner.

It is useful to now describe the structure of the primary cache (L1) as instantiated in each of the processor cores 101a-101h. For ease of discussion, the primary cache (L1) structure will be described with respect to processor core 101a, i.e., Core 0. It should be understood, however, that the description provided for the primary cache of processor core 101a is equally applicable to the primary cache in each of processor cores 101b-101h, i.e., Core 1 through Core 7.

Each of the instruction cache (L1 I$) 103a and the data cache (L1 D$) 105a is defined two structures, namely a tag structure and a data structure. It should be noted that the data cache (L1 D$) 105a is not to be confused with the data structure. The data structure represents one of two parts of the data cache (L1 D$) 105a, as well as one of two parts of the instruction cache (L1 I$) 103a. Thus, the instruction cache (L1 I$) 103a is defined to have an instruction cache tag structure and an instruction cache data structure. Also, the data cache (L1 D$) 105a is defined to have a data cache tag structure and a data cache data structure.

Each entry in the instruction cache tag structure has a corresponding entry in the instruction cache data structure. Also, each entry in the data cache tag structure has a corresponding entry in the data cache data structure. A given entry in the instruction cache tag structure is defined to store a memory address ("address" hereafter) for data stored in the corresponding entry in the instruction cache data structure. Also, a given entry in the data cache tag structure is defined to store an address for data stored in the corresponding entry in the data cache data structure. Thus, the instruction cache tag structure and the instruction cache data structure are equivalent in terms of the number and arrangement of entries. Similarly, the data cache tag structure and the data cache data structure are equivalent in terms of the number and arrangement of entries.

FIG. 2 is an illustration showing an tag structure corresponding to each of the instruction cache 103a tag structure and the data cache 105a tag structure, in accordance with an exemplary embodiment of the present invention. The tag structure is defined as a two-dimensional structure having a number of rows identified as "indices" and a number of columns identified as "ways." In the exemplary embodiment of FIG. 2, the tag structure includes 128 indices and 4 ways. It should be appreciated, however, that other embodiments of the present invention can utilize a different number of indices and a different number of ways to define the tag structure. Each entry in the tag structure corresponds to a particular index (i) and a particular way (w). Each entry in the tag structure specifies an address, a validity status, and an expected parity result. The address is defined within a tag portion of the entry. In one embodiment, the index corresponding to the entry is embedded within the tag portion of the entry. The validity status is defined as a single validity bit. A state, i.e., high or low, of the validity bit identifies whether the tag portion of the entry is valid or not valid. In one embodiment, a high state of the validity bit can be used to indicate a valid tag portion. In another embodiment, a low state of the validity bit can be used to indicate a valid tag portion. For ease of discussion, the remainder of this disclosure is based on using a low state of the validity bit to indicate a valid tag portion. The state of the validity bit is set based on a parity check of the tag portion of the entry.

The expected parity result is defined as a single parity bit. A state, i.e., high or low, of the single parity bit represents a result that is expected from performing a parity check of the tag portion of the entry. In one embodiment, the parity check is performed by evaluating an exclusive-or (XOR) combination of the tag portion of the entry. More specifically, a first bit of the tag portion of the entry is XOR'd with a second bit of the tag portion of the entry to generate an intermediate XOR combination. The intermediate XOR combination is then XOR'd with a third bit of the tag portion of the entry to generate an updated intermediate XOR combination. The updated intermediate XOR combination is XOR'd with the next bit of the tag portion of the entry and so on until the last bit of the tag portion of the entry has been XOR'd. The final result of XOR'ing all the bits of the tag portion of the entry represents a parity check signal. For example, if the tag portion was represented as "1011", the parity check signal would be "1." If the parity check signal matches the state of the parity check bit, the parity of the tag portion of the entry is good and the validity bit remains low. If the parity check signal does not match the state of the parity check bit, the parity of the tag portion of the entry is bad and the validity bit is reset to high to invalidate the entry. It should be appreciated that other parity check methods, e.g., even parity, can be used to check the validity of the tag portion. Furthermore, alternative embodiments can use error detection schemes other than parity check methods to check the validity of the tag portion and set the validity bit accordingly.

FIG. 3 is an illustration showing a data structure corresponding to each of the instruction cache 103a data structure and the data cache 105a data structure, in accordance with the exemplary embodiment of FIG. 2. As previously discussed, each entry in the tag structure of FIG. 2 has a corresponding entry in the data structure of FIG. 3. Thus, the data structure of FIG. 3 is identical to the two-dimensional tag structure of FIG. 2. Therefore, if an address is located in the tag structure of FIG. 2, the index and way values corresponding to the address can be used to retrieve the appropriate data entry from the data structure of FIG. 3.

Referring back to FIG. 1, the secondary cache (L2) is defined to include a primary cache tag directory. More specifically, each bank of the secondary cache 111a-111d is defined to include a portion of the complete primary cache tag directory. The primary cache tag directory is a representation of the tag structure of the primary cache of each processor core 101a-101h. The L2 Bank 0 (111a) includes an L1 instruction cache (I$) tag directory 115a and an L1 data cache (D$) tag directory 117a. The L2 Bank 1 (111b) includes an L1 instruction cache (I$) tag directory 115b and an L1 data cache (D$) tag directory 117b. The L2 Bank 2 (111c) includes an L1 instruction cache (I$) tag directory 115c and an L1 data cache (D$) tag directory 117c. The L2 Bank 3 (111d) includes an L1 instruction cache (I$) tag directory 115d and an L1 data cache (D$) tag directory 117d.

Each of the L1 instruction cache (I$) tag directories 115a-115d represents a portion of the primary instruction cache (L1 I$) tag structure of each processor core 101a-101h. Similarly, each of the L1 data cache (D$) tag directories 117a-117d represents a portion of the primary data cache (L1 D$) tag structure of each processor core 101a-101h. In one embodiment, the L1 I$ and L1 D$ tag directories, 115a and 117a respectively, of the L2 Bank 0 (111a) are defined to represent index lines 0 through 31 of the tag structures of the primary instruction cache (L1 I$) and primary data cache (L1 D$), respectively, of each processor core 101a-101h.

Figure 4A:
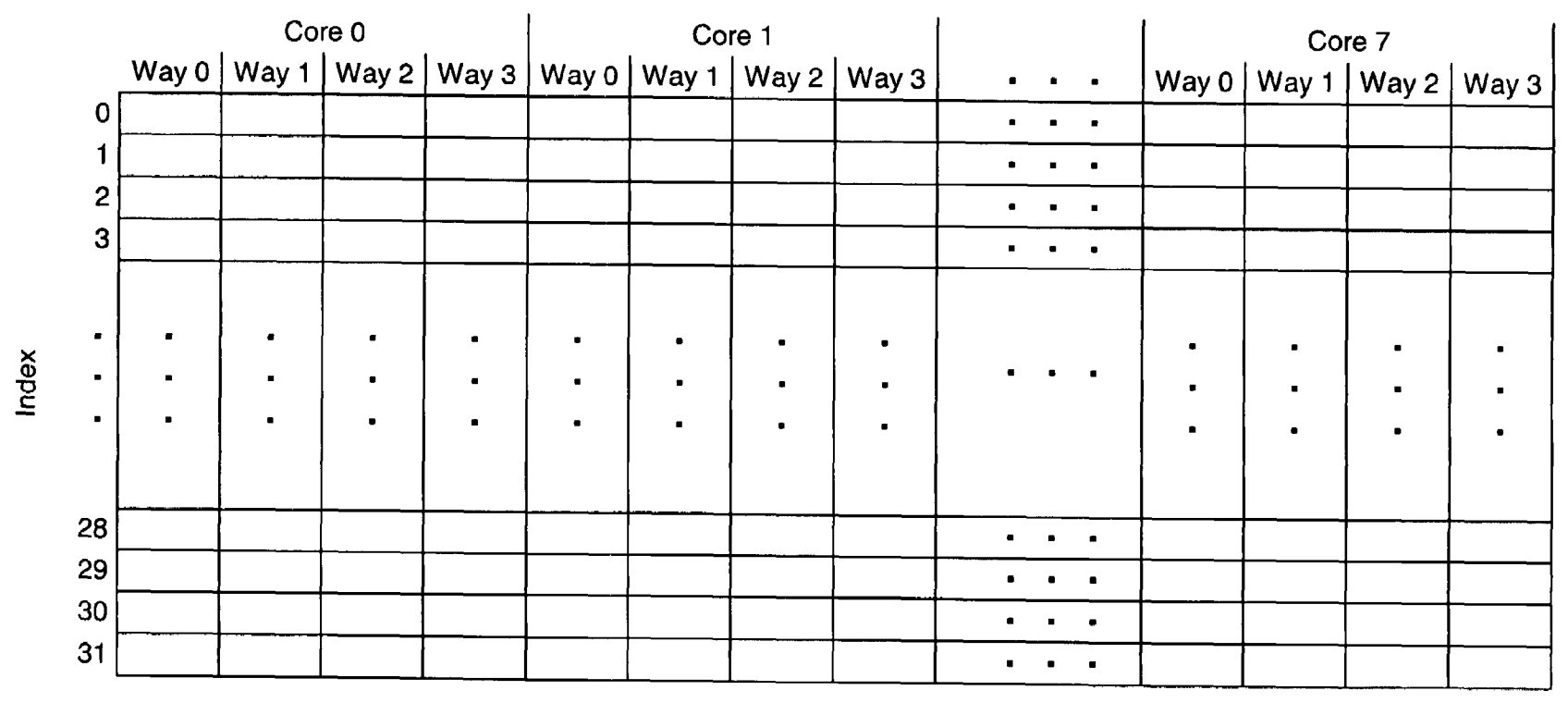
Figure 4B:
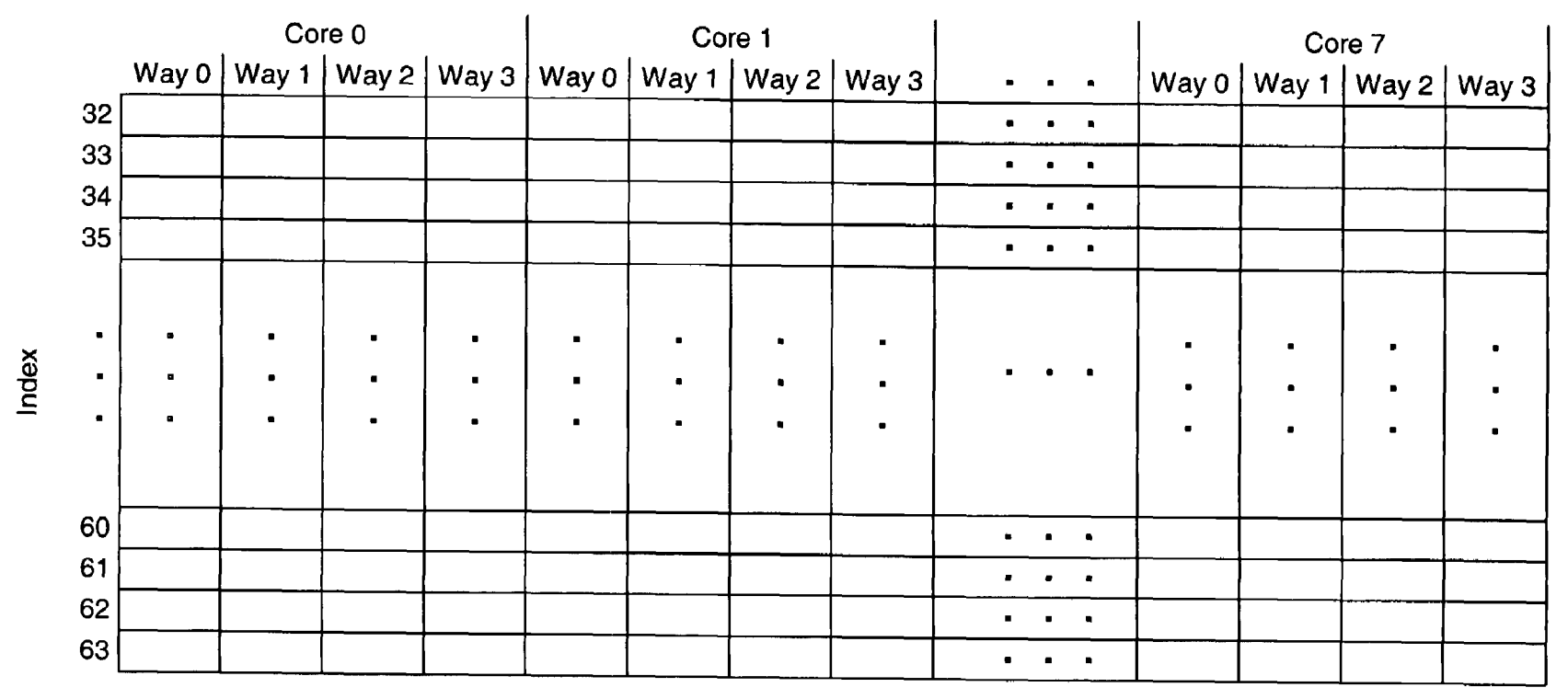
Figure 4D:
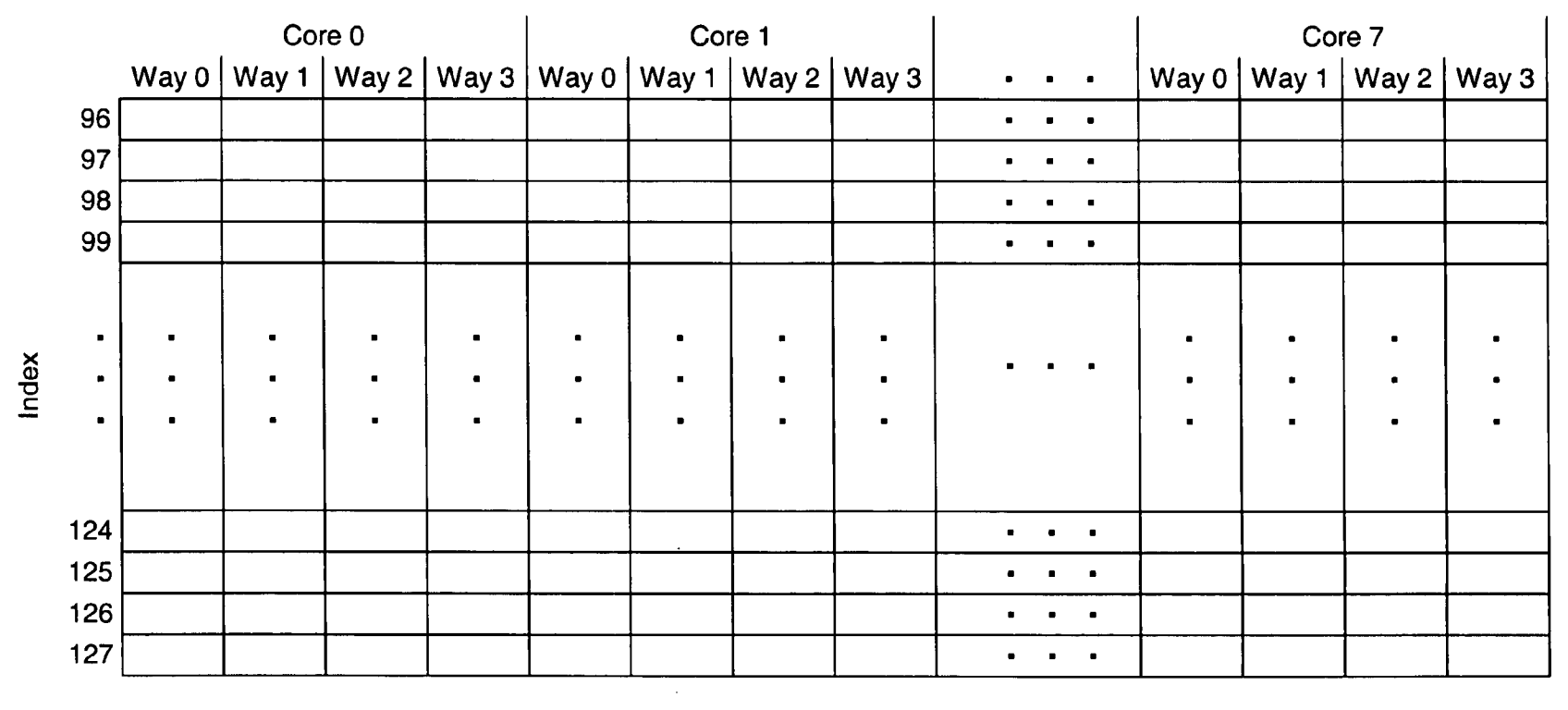

FIG. 4A is an illustration showing an exemplary layout of the L1 I$ tag directory 115a and the L1 D$ tag directory 117a of L2 Bank 0 (111a). In the present embodiment, the L1 I$ and L1 D$ tag directories, 115b and 117b respectively, of the L2 Bank 1 (111b) are defined to represent index lines 32 through 63 of the tag structures of the primary instruction cache (L1 I$) and primary data cache (L1 D$), respectively, of each processor core 101a-101h. FIG. 4B is an illustration showing an exemplary layout of the L1 I$ tag directory 115b and the L1 D$ tag directory 117b of L2 Bank 1 (111b). In the present embodiment, the L1 I$ and L1 D$ tag directories, 115c and 117c respectively, of the L2 Bank 2 (111c) are defined to represent index lines 64 through 95 of the tag structures of the primary instruction cache (L1 I$) and primary data cache (L1 D$), respectively, of each processor core 101a-101h. FIG. 4C is an illustration showing an exemplary layout of the L1 I$ tag directory 115c and the L1 D$ tag directory 117c of L2 Bank 2 (111c). In the present embodiment, the L1 I$ and L1 D$ tag directories, 115d and 117d respectively, of the L2 Bank 3 (111d) are defined to represent index lines 96 through 127 of the tag structures of the primary instruction cache (L1 I$) and primary data cache (L1 D$), respectively, of each processor core 101a-101h. FIG. 4D is an illustration showing an exemplary layout of the L1 I$ tag directory 115d and the L1 D$ tag directory 117d of L2 Bank 3 (111d).

The tag directories (115a-115d and 117a-117d) in the secondary cache (L2), as previously described, are reverse-mapped tag directories intended to represent a current copy of the tag structures of the primary cache (103a-103h and 105a-105h) of each processor core 101a-101h. Therefore, the tag directories (115a-115d and 117a-117d) in the secondary cache (L2) can be used to maintain coherency in the cache system of the multiprocessor chip 100. When using the reverse-mapped tag directories (115a-115d and 117a-117d) to maintain coherency in the cache system, it is important to keep the reverse-mapped tag directories (115a-115d and 117a-117d) consistent with the tag structures of the primary cache (103a-103h and 105a-105h). Otherwise, a situation may occur in which a single address becomes associated with an incorrect data entry or multiple data entries.

To describe the secondary cache's responsibility with respect to maintaining coherency in the cache system, consider a situation in which a thread operating in a first processor core needs to modify data corresponding to a particular address. Further consider that the particular address is stored in the primary data cache (L1 D$) tag structure of both the first processor core and a second processor core. The secondary cache is responsible for maintaining coherency between the L1 D$ tag structure in each of the first and second processor cores. The secondary cache is also responsible for enabling the primary cache in the first processor to be modified to satisfy the request of the thread operating in the first processor.

In addition to maintaining coherency in the event of data modification as described above, the cache system also needs to maintain coherency in the presence of corrupted data. Consider a situation in which a thread executing on a given processor core issues a request that data be accessed at a target address. The target address includes an identification of a target index, i.e., line, within the tag structure of the primary cache at which the target address resides. However, the target address does not indicate the particular tag entry of the target index corresponding to the target address. Thus, each of the four tag entries of the target index is compared on a bit-wise basis to the target address. If the target address matches a particular entry at the target index, the target index value, i.e., line number, and the "way" value, i.e., column number, corresponding to the matching tag entry are used to retrieve the appropriate data entry from the corresponding data structure of the primary cache. If the target address does not match either entry at the target index, the data request is passed down to the secondary cache for processing.

In addition to performing the bit-wise comparison of the target address to each tag entry of the target index, the validity of each tag entry is also verified. As previously discussed, a parity check can be used to verify the validity of each tag entry. For a given tag entry, the parity check evaluates the XOR combination of the tag portion of the tag entry and compares the result of the XOR combination to the state of the parity bit associated with the tag entry. If the XOR combination result does not match the parity bit, a parity error exists. The parity error can cause a false mismatch or a false hit when comparing the target address to the tag portion of each tag entry. Both the false mismatch and the false match conditions can either corrupt or kill an executing thread associated with the parity error. Therefore, the cache system should be capable of identifying and handling parity errors within the primary cache while maintaining coherency within the cache system.

In the present invention, whenever a parity error is detected by the primary cache, the primary cache relies on the secondary cache to service the parity error condition. Upon encountering the parity error in the primary cache (either instruction cache or data cache) of a given processor core, a load-store unit (or fetch unit) of the primary cache issues a tag parity packet to the secondary cache. The target address at which the parity error occurred is included in the tag parity packet. The tag parity packet communicates to the secondary cache the parity error condition, the processor core whose primary cache contains the parity error, and the particular index of the primary cache tag structure at which the parity error exists. Following issuance of the tag parity packet, the primary cache further issues to the secondary cache a load (or ifetch) request for the data corresponding to the target address that was being processed when the parity error was encountered.

Upon receiving the tag parity packet from the primary cache, the secondary cache invalidates all tag entries in the reverse-mapped tag directory corresponding to the index value of the target address. Then, the secondary cache sends an acknowledgment communication to the primary cache of the processor core from which the tag parity packet was received. Receipt of the acknowledgment enables the primary cache to invalidate all tag entries in the tag structure corresponding to the index value of the target address. Upon receiving the load request, the secondary cache responds with the requested data corresponding to the target address and updates the reverse-mapped tag directory to reflect storage of the requested data in the primary cache of the processor core from which the load request was received. It should be understood that operations performed by each of the primary cache and the secondary cache are controlled by primary cache logic and secondary cache logic, respectively. It should be further understood that each of the primary cache logic and the secondary cache logic can be defined by multiple hardware portions that are each configured to perform specific tasks.

Figure 5:
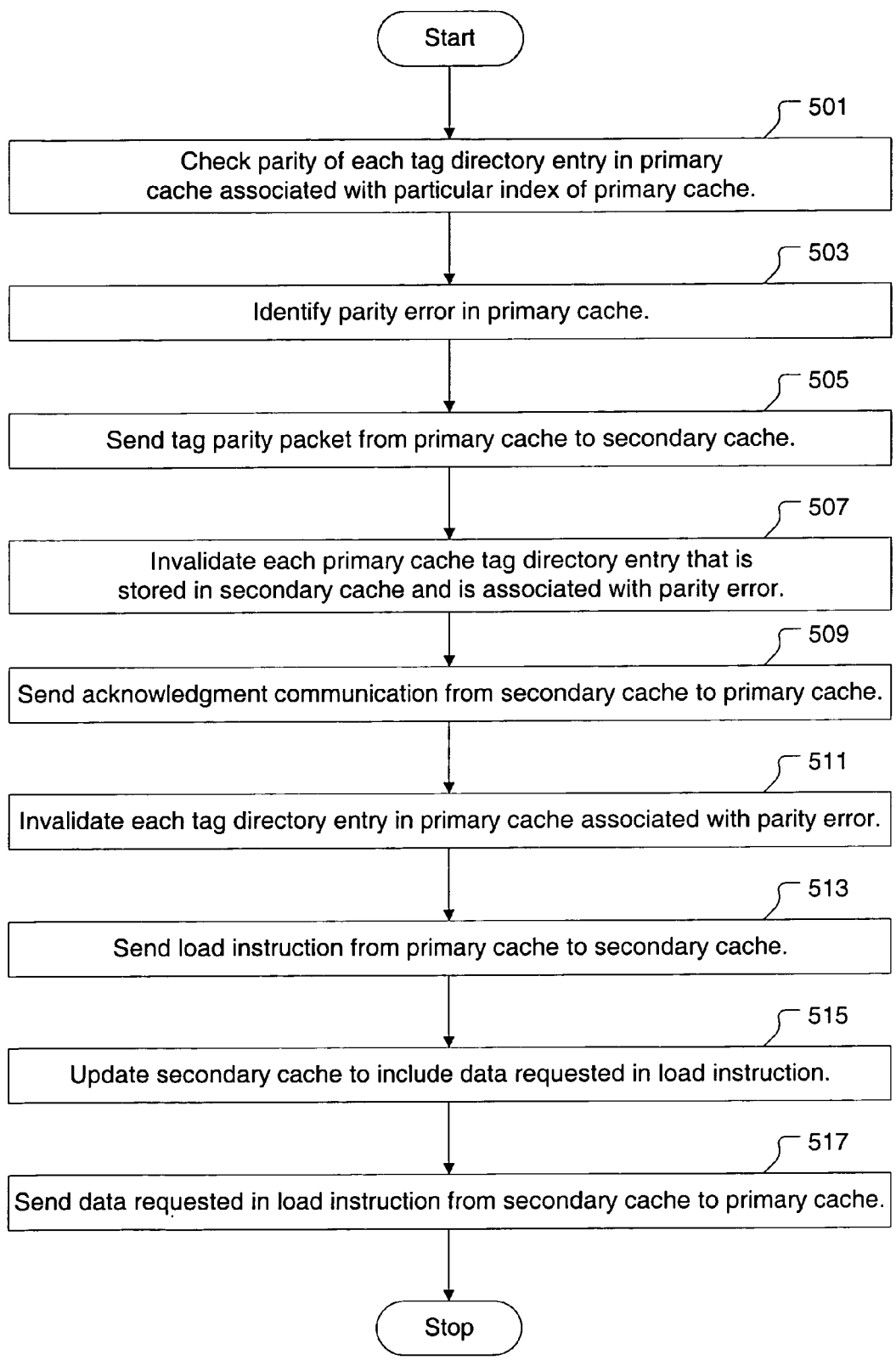
FIG. 5 is an illustration showing a flowchart of a method for maintaining coherency between a primary cache and a secondary cache in a directory-based cache system, in accordance with one embodiment of the present invention.

FIG. 5 is an illustration showing a flowchart of a method for maintaining coherency between a primary cache and a secondary cache in a directory-based cache system, in accordance with one embodiment of the present invention. The method includes an operation 501 for checking a parity of each tag entry in a primary cache that is associated with a particular index of the primary cache. In one embodiment, the particular index is represented within a target address associated with a data request generated by an executing application or thread. Additionally, in one embodiment, checking the parity of each tag entry can include evaluating an exclusive-or combination of each bit of a particular tag entry to generate a parity check signal, and comparing the parity check signal to a state of a parity bit associated with the particular tag entry.

The method further includes an operation 503 for identifying a parity error in the primary cache. With respect to the previous embodiment, a mismatch between the parity check signal and the state of the parity bit indicates a parity error. In an operation 505, a tag parity packet is sent from the primary cache to the secondary cache in response to identifying the parity error in the operation 503. In response to the tag parity packet, the method provides an operation 507 for invalidating each entry, associated with the parity error, that resides in a primary cache tag directory that is stored in the secondary cache. In an operation 509, the secondary cache sends an acknowledgment communication to the primary cache to indicate receipt of the tag parity packet. In response to receiving the acknowledgment at the primary cache, the method includes an operation 511 for invalidating each tag directory entry in the primary cache associated with the parity error. In one embodiment, each tag directory entry in the primary cache and secondary cache associated with the parity error can be invalidated by resetting a validity bit associated with each tag directory entry.

The method further includes an operation 513 for sending a load instruction from the primary cache to the secondary cache. The load instruction directs the secondary cache to obtain the data corresponding to the target address. In one embodiment, sending the load instruction in the operation 513 is performed immediately after sending the tag parity packet in the operation 505. In an operation 515, the secondary cache is updated to include data requested in the load instruction sent in operation 513. It should be appreciated that operation 515 is performed following operation 507, such that the secondary cache is updated following invalidation of each entry, associated with the parity error, that resides in the primary cache tag directory that is stored in the secondary cache. Additionally, the data requested in the load instruction of operation 513 is sent from the secondary cache to the primary cache in an operation 517. It should be appreciated that operation 517 is performed following operation 511, such that the requested data is stored in the primary cache following invalidation of each tag directory entry in the primary cache associated with the parity error. In one embodiment, the requested data is sent to the requesting application or thread in conjunction with performing operation 517.

The method of the present invention, as described with respect to FIG. 5, enables coherency to be maintained in the cache system when parity errors are encountered and resolved. It should be appreciated that in the present invention the primary cache is required to send two communications to the secondary cache upon encountering a parity error, wherein the first communication is a tag parity packet and the second communication is a load instruction. Flushing of the tag entries associated with the parity error ensures that coherency is maintained between the primary and secondary caches.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A multiprocessor chip, comprising:
a primary cache defined to include a tag structure;
a secondary cache defined to include a tag directory representing the tag structure of the primary cache;
a first portion of primary cache logic defined to identify a parity error in the tag structure of the primary cache;
a second portion of primary cache logic defined to send a tag parity packet from the primary cache to the secondary cache in response to identification of the parity error by the first portion of primary cache logic;
a first portion of secondary cache logic defined to invalidate each entry in the tag directory of the secondary cache as identified by the tag parity packet;
a second portion of secondary cache logic defined to send an acknowledgment of receipt of the tag parity packet to the primary cache logic; and
a third portion of primary cache logic defined to invalidate each entry in the tag structure of the primary cache associated with the parity error in response to receipt of the acknowledgement from the secondary cache.

2. The multiprocessor chip of claim 1, wherein each entry in the tag structure of the primary cache and the tag directory of the secondary cache includes,
a tag portion for identifying a memory address,
a parity bit for identifying a correct parity state to be used in checking the parity of the tag portion, and
a validity bit for identifying whether the tag portion is valid or invalid.

3. The multiprocessor chip of claim 1, wherein the second portion of primary cache logic is further defined to send a load instruction from the primary cache to the secondary cache after sending the tag parity packet from the primary cache to the secondary cache.

4. The multiprocessor chip of claim 3, wherein the first portion of secondary cache logic is further defined to update the secondary cache to include data requested in the load instruction following the invalidation of each entry in the tag directory of the secondary cache as identified by the tag parity packet.

5. The multiprocessor chip of claim 3, wherein the second portion of secondary cache logic is further defined to send data requested in the load instruction from the secondary cache to the primary cache following invalidation of each entry in the tag structure of the primary cache associated with the parity error.

6. The multiprocessor chip of claim 1, further comprising:
a plurality of processing cores, wherein each of the plurality of processing cores includes a separate and independent instantiation of the primary cache, each instantiation of the primary cache being accompanied by a respective instantiation of the first, second, and third portions of primary cache logic.

7. A method for maintaining coherency between a primary cache and a secondary cache in a directory-based cache system, comprising:
identifying a parity error in the primary cache;
sending a tag parity packet from the primary cache to the secondary cache in response to identifying the parity error;
invalidating each primary cache tag directory entry that is stored in the secondary cache and is associated with the parity error;
receiving an acknowledgement at the primary cache to indicate receipt of the tag parity packet at the secondary cache; and
invalidating each tag directory entry in the primary cache associated with the parity error in response to receiving the acknowledgment.

8. The method of claim 7, further comprising:
checking a parity of each tag directory entry in the primary cache that is associated with a particular index of the primary cache, wherein the particular index is represented within a target address associated with a data request generated by an executing application.

9. The method of claim 8, wherein checking the parity of each tag directory entry includes,
evaluating an exclusive-or combination of each bit of a particular tag entry to generate a parity check signal, and
comparing the parity check signal to a state of a parity bit associated with the particular tag directory entry, wherein a mismatch between the parity check signal and the state of the parity bit indicates a parity error.

10. The method of claim 7, wherein invalidating each primary cache tag directory entry in the primary cache and secondary cache associated with the parity error is performed by resetting a validity bit associated with each tag directory entry to be invalidated.

11. The method of claim 7, further comprising:
sending a load instruction from the primary cache to the secondary cache after sending the tag parity packet from the primary cache to the secondary cache; and
updating the secondary cache to include data requested in the load instruction following invalidating each primary cache tag directory entry in the secondary cache associated with the parity error.

12. The method of claim 11, further comprising:
sending data requested in the load instruction from the secondary cache to the primary cache following invalidating each tag directory entry in the primary cache associated with the parity error; and
sending data requested in the load instruction to an executing application responsible for generating an initial request for the data.

13. An apparatus for maintaining coherency within a cache system, comprising:
a primary cache including a tag structure;
a secondary cache including a tag directory structure, wherein the tag directory structure represents the tag structure of the primary cache;
primary cache logic defined to control the primary cache and communicate with the secondary cache; and
secondary cache logic defined to control the secondary cache and communicate with the primary cache,
wherein the primary cache logic is configured to identify a parity error in any entry of the tag structure of the primary cache, the primary cache logic being configured to send a tag parity packet to the secondary cache logic upon identifying the parity error, the secondary cache logic being configured to invalidate each entry in the tag directory structure associated with the parity error upon receiving the tag parity packet, the secondary cache logic being further configured to send an acknowledgement to the primary cache logic indicating receipt of the tag parity packet at the secondary cache logic, the primary cache logic being further configured to invalidate each entry in the tag structure associated with the parity error upon receiving the acknowledgment from the secondary cache logic.

14. The apparatus of claim 13, further comprising:
a data structure defined within the primary cache, wherein each entry of the tag structure has a corresponding entry in the data structure, each entry in the tag structure being defined to store an address for the corresponding entry in the data structure.

15. The apparatus of claim 13, wherein the primary cache is defined within a processor core of a multiprocessor chip, the primary cache and the secondary cache being configured to communicate with each other through a bus of the multiprocessor chip.

16. The apparatus of claim 15, wherein the multiprocessor chip is defined to include multiple processor cores, each of the multiple processor cores defined to include a respective instantiation of the primary cache, each instantiation of the primary cache being configured to communicate with the secondary cache through the bus.

17. The apparatus of claim 13, wherein the primary cache is defined to include an instruction cache and a data cache, the instruction cache being defined to include an instruction cache tag structure, the data cache being defined to include a data cache tag structure, the tag directory structure of the secondary cache including a first portion representing the instruction cache tag structure of the primary cache, the tag directory structure of the secondary cache including a second portion representing the data cache tag structure of the primary cache.

18. The apparatus of claim 13, wherein the primary cache logic includes parity check logic defined to check a parity of an entry in the tag structure by evaluating an exclusive-or combination of each bit of the entry to generate a parity check signal, the parity check logic further defined to compare the parity check signal to a state of a parity bit associated with the entry, wherein the parity check logic is further defined to signify a parity error by resetting a validity bit associated with the entry upon identifying a mismatch between the parity check signal and the state of the parity bit.

19. The apparatus of claim 13, wherein the primary cache logic is defined to send a load instruction from the primary cache to the secondary cache after sending the tag parity packet from the primary cache to the secondary cache, the secondary cache logic being defined to update the secondary cache to include data requested in the load instruction following operation of the secondary cache logic to invalidate each entry in the tag directory structure associated with the parity error.

20. The apparatus of claim 19, wherein the secondary cache logic is defined to send data requested in the load instruction from the secondary cache to the primary cache following operation of the primary cache to invalidate each entry in the tag structure associated with the parity error.

* * * * *